Patented Dec. 19, 1933

1,940,419

UNITED STATES PATENT OFFICE 1,940,419

VAT DYESTUFF OF THE DIBENZANTHRONE SERIES

Edward T. Howell, Milwaukee, and Otto Stallmann, South Milwaukee, Wis., assignors, by mesne assignments, to E. I. du Pont de Nemours & Company, a corporation of Delaware No Drawing. Application July 6, 1931
Serial No. 549,092

10 Claims. (Cl. 260—61)

This invention relates to vat dyestuffs of the dibenzanthrone series. It is an object of this invention to produce novel vat dyestuffs of dihydroxy-dibenzanthrone or its monoalkylated derivatives. Other and further important objects of this invention will appear as the description proceeds.

The oxidized dibenzanthrone derivatives which form the initial materials in our present invention may be represented by the general formula:

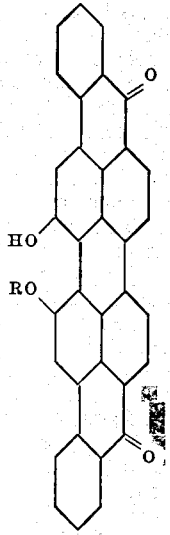

wherein R stands for hydrogen or an alkyl group. The dihydroxy compound may be obtained by oxidizing and partially reducing dibenzanthrone in accordance with the process set forth in Examples 1 and 3 of U. S. Patent No. 1,093,427. The compounds wherein R stands for an alkyl group may be obtained from the latter dihydroxy bodies by alkylation in known manner with suitable alkylating agents. (See for instance German Patent No. 456,582.)

We have now found that when hydroxy-dibenzanthrones of the above type, having at least one reactive hydroxy group (OH, ONa, etc.), are converted into the corresponding iso-propyl ethers, valuable bluish green vat dyestuffs result, of outstanding fastness qualities and excellent printing properties. Of particular merit in this latter respect is the di-isopropyl derivative obtained by complete etherification of the dihydroxy compound.

Our preferred method of introducing the isopropyl group, consists in treating said hydroxydibenzanthrone compounds with suitable isopropylating agents, such as isopropyl halides or isopropyl esters of aryl sulfonic acids, in the presence of acid binding agents. In the case where dihydroxy-dibenzanthrone is used for isopropylation, the reaction may be controlled to produce a mono-isopropyl ether or a di-isopropyl ether. Moreover, the intermediate mono-isopropyl ether may be isolated and subsequently subjected to alkylation to etherify the second OH group.

Without limiting our invention to any particular procedure the following examples are given to illustrate our preferred mode of operation. Parts given are parts by weight.

Example 1

30 parts of dry, finely divided dihydroxy-dibenzanthrone are pasted up with 10 parts of soda ash and 50 parts of water, dried and pulverized. The resultant powder is suspended in 200 parts of isopropyl bromide, and 20 parts of dry soda ash and 5 parts of fused sodium acetate are added. The mixture is heated in a lead lined autoclave to 115° C., and stirred at this temperature for about 7 hours. The temperature is then further increased to about 130° to about 140° C. within a period of about ½ to 1 hour, and held at this temperature, with stirring, for about 4 hours. The mass is now cooled to room temperature; 500 parts of water are added; and the mass is boiled until free of isopropyl bromide. The residual mass is now filtered, and the filter cake is washed with water until free of alkali, dried and pulverized. The product constitutes mono-isopropyl ether of dihydroxy-dibenzanthrone, in crude state.

It is a blue crystalline solid, which may be recrystallized from dichloro-benzene in the form of small blue plates. It is readily soluble in hot dichlorobenzene or nitrobenzene with a deep-blue color. It is practically insoluble in water and in alcohol. It dissolves very readily in the usual hydrosulfite vat with a blue color, from which cotton may be dyed according to standard practice in blue shades. The dyeings, however, are not fast to light and to alkali, the latter changing the dyeing to a strongly yellowish green.

Concentrated sulfuric acid saponifies the product back to dihydroxy-dibenzanthrone.

Example 2

The crude mono-isopropyl ether obtained in

Example 1, is first purified, for instance, as follows:

20 parts of the crude, dry mono-isopropyl ether of dihydroxy-dibenzanthrone, as obtained in Example 1, are suspended in 350 parts of dry dichlorobenzene. The mixture is heated from about 20° to about 130° C., held at this temperature for 2 hours, and filtered.

To the filtrate, comprising mono-isopropyl-ether of dihydroxy-dibenzanthrone and dichlorobenzene, are added 10 parts of dry soda ash and 20 parts of isopropyl-bromide. The mixture is heated in a lead lined autoclave from about 160° to about 170° C., and stirred at this temperature for about 17 hours. It is now cooled to room temperature, 500 parts of water are added, and the mass is steam-distilled until free of isopropyl-bromide and dichlorobenzene. The residual mass is filtered, and the filter cake washed with water until free of alkali, dried and pulverized. The product constitutes di-isopropyl-ether of dihydroxy-dibenzanthrone.

It is a green to blue crystalline powder, readily soluble in hot dichlorobenzene and nitrobenzene with a bluish-green color. It is practically insoluble in water or alcohol. It is sparingly soluble in cold dichlorobenzene, and consequently may be readily recrystallized from this solvent in the form of long, well-defined, bluish needles with a metallic lustre. The product dissolves very readily in the usual alkaline hydrosulfite vat, with a blue color and very pronounced red fluorescence, and dyes cotton according to standard practice in bluish-green shades fast to acids, alkalis, bleach and light.

Concentrated sulfuric acid saponifies the product back to dihydroxy-dibenzanthrone.

Example 3

28 parts of dry, finely divided dihydroxy-dibenzanthrone are pasted up with 12 parts of soda ash and 50 parts of water, dried and pulverized. The resultant powder is suspended in 600 parts of dry dichlorobenzene, and 20 parts of dry soda ash are added. The mixture is heated to 175–180° C. to drive off any moisture. It is now cooled to 150° C., and 27 parts of the isopropyl ester of p-toluene-sulfonic acid is slowly and uniformly added over a period of 5–6 hours. (The isopropyl ester required for this purpose may be prepared by reacting p-toluene-sulfone-chloride with isopropyl alcohol, in accordance with the procedure described in Berichte, vol. 54, page 1541, in conjunction with the isomeric n-propyl ester.) The mass is now continuously agitated at 150° C. for about 14 hours, then heated to reflux temperature (175–180° C.), and at this temperature additional 13 parts of isopropyl-p-toluene-sulfonate are slowly and uniformly introduced over a period of 4 to 5 hours. The mass is then further maintained at reflux temperature, with stirring, until its color has changed from a deep blue to a deep bluish green, which requires about 10 to 15 hours. It is now cooled to room temperature; 500 parts of water are added, and the mixture is steam distilled to remove the dichlorobenzene. The residual mass is filtered, and the filter cake washed with water until free of alkali, dried and pulverized.

If desired, the isolation of the dyestuff may be combined with a purification step, for instance as follows: The reaction mass containing the dyestuff and dichlorobenzene is cooled and filtered. To the filter-cake 100 parts of water are added and the mass is steam-distilled to remove the residual dichlorobenzene. It is then again filtered, washed with water until free of alkali, dried and pulverized.

The product is the di-isopropyl ether of dihydroxy-dibenzanthrone, whose properties have been described in Example 2.

It will be readily understood that the process described in Example 2 may be applied in the same manner to a mono-alkyl-ether of dihydroxy-dibenzanthrone other than iso-propyl, producing probably a mixed (unsymmetrical) isopropyl-alkyl-diether of dihydroxy-dibenzanthrone. Alternatively, one may start with the mono-isopropyl-ether of dihydroxy-dibenzanthrone, as produced, for instance, in accordance with Example 1, and further alkylate the same with a different alkylating agent to produce a mixed diether.

Example 4

10 parts of the crude, dry mono-isopropyl ether of dihydroxy-dibenzanthrone, as obtained, for instance, in Example 1, are suspended in 250 parts of dry dichlorobenzene; 20 parts of soda ash are added; and the mixture is heated under agitation from about 140° to about 150° C. At this temperature, 15 parts of dimethyl sulfate are gradually introduced over a period of one hour, and the mixture is further stirred at about 140° to about 150° C. until the deep blue color of the reaction mass changes to a bluish green coloration (which may require about 1 to 2 hours). The mass is now cooled to room temperature, and the dyestuff is isolated as in Example 2.

The dyestuff thus obtained is probably a mixed, iso-propyl-methyl ether of dihydroxy-dibenzanthrone. It dissolves in the usual alkaline hydrosulfite vat with a blue color exhibiting a pronounced red fluorescence, and dyes cotton according to the standard procedure in greenish shades, fast to acids and to alkalis.

Example 5

10 parts of crude, dry mono-isopropyl ether of dihydroxy-dibenzanthrone, as obtained, for instance, in Example 1, are suspended in 250 parts of dry dichlorobenzene, and to this suspension are added 10 parts of soda ash and 25 parts of ethylene-dibromide ($BrCH_2.CH_2Br$). The mixture is heated to reflux temperature (150° to 160° C.), and kept at this temperature, with stirring, for about 14 hours. It is then cooled and the dyestuff is isolated as in Example 2.

The dyestuff thus obtained (most probably a mixed ether) forms with alkaline hydrosulfite a blue vat, and dyes cotton therefrom, in the usual manner, in bluish-green shades, somewhat bluer than the symmetrical di-isopropyl ether obtained in Example 2.

It will be understood that the above processes may be applied to nuclear substitution derivatives of dibenzanthrone to produce corresponding derivatives of the isopropyl ethers. The color of the products in these cases, however, will not necessarily be a bluish-green, but will depend on the nature of the substituents.

Instead of dichlorobenzol in the above reaction, trichlorobenzol, or any other solvent or diluent of the type generally used in analogous reactions may be used.

Various other modifications may be introduced into our invention without departing from the spirit of the same, as will be readily understood to those skilled in the art.

In the claims below it should be understood that where we claim a new product, dyestuff, or article of manufacture, we mean to include this body not only in substance, but also in whatever state it exists when applied to material dyed, printed, or pigmented therewith.

By the terms "isopropyl ester", "isopropylating agent", isopropyl ether", etc., we mean to include only those compounds which contain no substituents in the 1 and 3 carbon atoms of the isopropyl group.

We claim:

1. An isopropyl ether of a hydroxy-dibenzanthrone compound.

2. An isopropyl ether of hydroxy-dibenzanthrone.

3. A dyestuff having the following general formula:

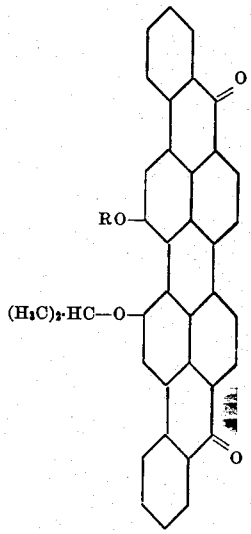

wherein R stands for hydrogen or an alkyl radical.

4. As a new compound the di-isopropyl-ether of dihydroxy-dibenzanthrone.

5. As a new compound the mono-isopropyl ether of dihydroxy-dibenzanthrone.

6. The process of producing a new dyestuff compound which comprises reacting with an isopropylating agent upon a hydroxy-dibenzanthrone compound.

7. The process of producing a new dyestuff compound which comprises reacting with an isopropyl ester and an acid binding agent upon a hydroxy-dibenzanthrone containing at least one reactive hydroxy group.

8. The process of producing a new dyestuff compound which comprises reacting with an isopropyl ester and an acid binding agent upon a hydroxy-dibenzanthrone of the general formula:

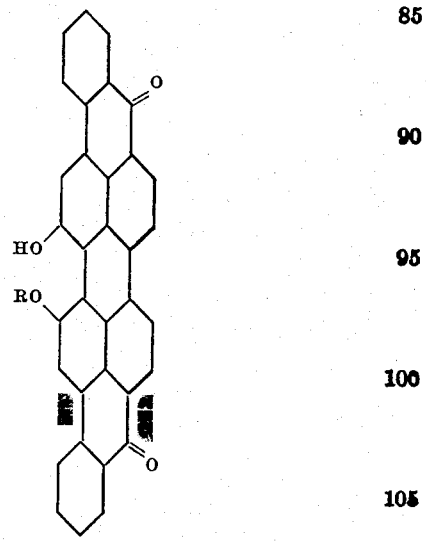

wherein R stands for a hydrogen atom or an alkyl group.

9. The process of producing the di-isopropyl ether of dihydroxy-dibenzanthrone which comprises reacting with an isopropyl ester and an acid binding agent upon the mono-isopropyl ether of dihydroxy-dibenzanthrone.

10. The process of producing the di-isopropyl ether of dihydroxy-dibenzanthrone which comprises reacting with an isopropyl ester and an acid binding agent upon dihydroxy-dibenzanthrone to produce the mono-isopropyl ether of dihydroxy-dibenzanthrone, and then reacting the latter with a further quantity of isopropyl ester and acid binding agent to produce the di-isopropyl ether.

EDWARD T. HOWELL.
OTTO STALLMANN.

CERTIFICATE OF CORRECTION.

Patent No. 1,940,419.                          December 19, 1933.

EDWARD T. HOWELL, ET AL.

It is hereby certified that error appears in the printed specification of the above numbered patent requiring correction as follows: Page 2, line 7, for "20°" read 120°; and that the said Letters Patent should be read with this correction therein that the same may conform to the record of the case in the Patent Office.

Signed and sealed this 1st day of May, A. D. 1934.

Bryan M. Battey (Seal)                                    Acting Commissioner of Patents.